(12) United States Patent
Abildgren et al.

(10) Patent No.: US 12,182,472 B2
(45) Date of Patent: Dec. 31, 2024

(54) LOCATION-BASED SYSTEMS AND METHODS FOR INITIATING WIRELESS DEVICE ACTION

(71) Applicant: Bose Corporation, Framingham, MA (US)

(72) Inventors: Rasmus Abildgren, Skørping (DK); Casper Bonde, Stoevring (DK)

(73) Assignee: Bose Corporation, Framingham, MA (US)

( * ) Notice: Subject to any disclaimer, the term of this patent is extended or adjusted under 35 U.S.C. 154(b) by 219 days.

(21) Appl. No.: 17/655,098

(22) Filed: Mar. 16, 2022

(65) Prior Publication Data
US 2023/0297320 A1    Sep. 21, 2023

(51) Int. Cl.
*G06F 3/16* (2006.01)
*H04R 3/00* (2006.01)
(Continued)

(52) U.S. Cl.
CPC .............. *G06F 3/165* (2013.01); *H04R 3/00* (2013.01); *H04W 4/021* (2013.01); *H04W 4/80* (2018.02);
(Continued)

(58) Field of Classification Search
CPC .............. H04W 72/40; H04W 72/542; H04W 74/0808; H04W 76/23; H04W 76/30; H04W 88/06; H04W 88/182; H04R 2420/07; H04R 5/033; H04R 5/04; H04R 3/00; H04R 3/12; H04R 1/1041; H04R 1/1016; H04R 2430/01; H04R 25/554; H04R 3/005; H04R 1/1083; H04R 1/406; H04R 2410/01; H04R 2420/01; H04R 2420/05; H04R 2460/01; H04R 2460/07; H04R 2499/11; H04R 25/43; H04R 29/005; H04R 1/1091; H04R 25/552;
(Continued)

(56) References Cited

U.S. PATENT DOCUMENTS 9,706,320 B2    7/2017  Starobin et al.
2018/0115844 A1    4/2018  Lu et al.
(Continued)

OTHER PUBLICATIONS

Woolley, Martin, "Bluetooth Direction Finding", Version 1.0.2, pp. 1-30, Oct. 13, 2021.
(Continued)

*Primary Examiner* — Lun-See Lao
(74) *Attorney, Agent, or Firm* — Bond, Schoeneck & King, PLLC

(57) ABSTRACT

Systems, devices, and methods for initiating an action based on location of a first device are provided. The first device, such as an earbud, includes a Bluetooth receiver. The Bluetooth receiver is configured to receive a wave signal transmitted by a second device, such as a smartphone. The first device further includes a processor. The processor is configured to calculate a location of the first device relative to the second device based on the wave signal. The processor is further configured to determine a zone status of the first device based on the location of the first device relative to the second device and a predetermined zone. The processor is further configured to initiate the action based on the zone status.

18 Claims, 12 Drawing Sheets

(51) Int. Cl.
*H04W 4/021* (2018.01)
*H04W 4/80* (2018.01)
*H04W 76/10* (2018.01)

(52) U.S. Cl.
CPC ......... *H04W 76/10* (2018.02); *H04R 2420/07* (2013.01)

(58) Field of Classification Search
CPC .. H04R 29/002; H04R 1/08; H04R 2201/107; H04R 25/55; H04R 27/00; H04R 27/02; H04M 2250/02; H04M 1/6066; H04M 1/72412; H04M 1/72442; H04B 17/318
USPC .............................................. 381/77, 56–57
See application file for complete search history.

(56) References Cited

U.S. PATENT DOCUMENTS

| | | | |
|---|---|---|---|
| 2019/0073179 A1* | 3/2019 | Laidlaw | G06F 3/147 |
| 2019/0394589 A1* | 12/2019 | Starobin | G06F 3/041 |
| 2020/0280800 A1* | 9/2020 | Wilberding | H04R 1/403 |
| 2022/0022132 A1* | 1/2022 | Knaappila | H04W 52/0216 |
| 2022/0201392 A1* | 6/2022 | Liu | G06F 3/167 |
| 2023/0069230 A1* | 3/2023 | Girardier | H04S 7/30 |
| 2023/0224078 A1* | 7/2023 | Abildgren | H04L 1/0041 714/758 |

OTHER PUBLICATIONS

The International Search Report and the Written Opinion of the International Searching Authority, PCT Patent Application No. PCT/US2023/015357, dated Jul. 3, 2023, pp. 1-12.

\* cited by examiner

LOCATION-BASED SYSTEMS AND METHODS FOR INITIATING WIRELESS DEVICE ACTION

BACKGROUND

Hearing-impaired patrons of a concert, motion picture screening, theatrical production, worship service, sporting event, etc., often require amplification of the sounds of the performance, event, or screening without distortion and distracting background noise. Currently, this may be implemented through use of a conducted loop system. In a conducted loop system, audio from the sound system of the performance, event, or screening is provided to an induction loop cable. The induction loop cable radiates the audio data received from the sound system. This radiated audio data is received by a pick-up coil of a hearing aid worn by a patron located within the loop formed by the induction loop cable, thus allowing the patron to hear amplified audio directly from the sound system, without the distortions and/or background noise of their environment. However, using a conducted loop system requires physical installation of an induction loop cable, limiting the configurability and the flexibility of the conducted loop system.

SUMMARY

Aspects and implementations of the present disclosure are generally directed to Bluetooth-based systems and methods for determining wireless device location and initiating an action based on the determined location.

The present disclosure provides improved systems, devices, and methods for initiating an action by based on the location of a first device (such as a wireless device) relative to a second device (such as a source device). The wireless device includes a Bluetooth receiver configured to receive an advertisement packet transmitted by the source device. The advertisement packet includes an advertisement protocol data unit (PDU) and a wave signal, such as a radio frequency (RF) tone. The system then determines the relative location of the wireless device from the source device based on the transmission and reception of the wave signal between the wireless audio device and the source device. The system then determines if the relative location is within a predetermined zone. The predetermined zone is defined by a set of coordinates embedded within the advertisement PDU. The advertisement PDU may also include a coordinate format header defining the format of the coordinates, such as rectangular or polar. The system then determines the zone status of the wireless device relative to the predetermined zone. The zone status may indicate, among other information, whether or not the wireless device is located within the predetermined zone. If this zone status indicates the wireless device is within the predetermined zone, the wireless device initiates an action, such as playing audio, forming a wireless connection, transmitting data, etc. Alternatively, if the zone status indicates the wireless device is within the predetermined zone, the wireless device may prevent an action from occurring. In this way, the predetermined zone replaces the induction loop cable used in conducted loop systems, as the coordinates and coordinate format header of the predetermined zone correspond to the physical dimensions and location of the induction loop cable. Further, the built-in Bluetooth receiver of the wireless device replaces the functionality of the pick-up coil of the conducted loop system.

In some examples, the relative location of the wireless device is determined based on an angle of arrival (AoA) or an angle of departure (AoD) analysis of the transmission and reception of the wave signal. In one example, the source device includes an antenna array, and the wireless device determines the relative location from the source device via AoD. Alternatively, the wireless device may include an antenna array, and the wireless device determines the relative location from the source device via AoA.

In some examples, the wireless device is an audio device, such as a hearing aid, an earbud, or an audio headset, while the source device is an aspect of an audio sound system, such as a mixing board, powered speaker, etc. In this example, the isochronous stream advertisement transmitted by the source device includes an announcement corresponding to a Bluetooth broadcast isochronous stream (BIS). This BIS may correspond to the sound system audio of a performance, event, or screening. If the audio device is located within the predetermined zone, the wireless device action may then initiate playback of audio corresponding to the BIS. In a further example, the audio may be one portion of a continuous loop, while the BIS includes metadata indicating that only one portion of the continuous loop is played back. This example may be particularly useful in places such as airport terminals or subway stations, where looped information (such as departure times, luggage restrictions, etc.) may be continually provided to travelers, but an individual traveler may only need to hear the information one time, and repetition of the same information may be irritating and distracting.

In some examples, multiple predetermined zones may be defined. Depending on the application, some of the predetermined zones overlap, while others may be nonoverlapping. In a further example, each of the multiple predetermined zones may correspond to a different wireless device action. For example, a first predetermined zone may trigger the wireless device to select an audio channel for playback, while a second predetermined zone may trigger the wireless device to modify an equalizer setting of the audio playback, while a third predetermined zone may trigger the wireless device to modify a volume setting of the audio playback. In further examples, a BIS may facilitate the movement of the wireless device across multiple predetermined zones by including metadata corresponding to an audio channel to be played back by the wireless device, an additional BIS corresponding to the predetermined zone, or a transition BIS corresponding to a second predetermined zone.

In some examples, if the wireless device is within the predetermined zone, the wireless device action initiates the formation of a Bluetooth connection between the wireless device and the source device. In a further example, the Bluetooth connection is a connected isochronous stream (CIS). The CIS can be bidirectional or unidirectional, depending on the application. Further to this example, the initiation of the formation of the Bluetooth connection may also trigger the wireless device to pair with the source device.

In some examples, the wireless device action triggers the wireless device to request a broadcast code from the source device. The broadcast code can be used to decrypt an encrypted BIS. Such encryption may be desirable in banks, kiosks, cash registers, ticket booths, applications where privacy is desired. The source device may be configured to only transmit the broadcast code to the wireless device if the wireless device is within a specified predetermined zone.

In some examples, the wireless device is an audio device, such as a hearing aid, an earbud, or an audio headset, while the source device is an aspect of a sound system (such as a home audio system or a professional audio sound system), such as a television, soundbar, audio receiver, etc. One or more predetermined zones may define where the wireless audio device would be triggered to playback audio corresponding to a BIS originating from the source device. For example, such a predetermined zone may be positioned around a couch facing the television. In this way, an individual watching television while seated on the couch will hear audio from the television via the BIS, while another individual standing away from the couch engaged in a conversation and not watching television will not receive undesired audio from the BIS.

In some examples, the wireless device is a portable speaker, and the source device is a television or a soundbar. In this example, a user wishes to place several portable speakers around the source device in a surround sound configuration. The source device defines a plurality of predetermined zones, with each predetermined zone corresponding to one or more audio properties, such as left-right channel selection. By determining the relative location of the portable speaker relative to the source device, the portable audio device may be configured to playback audio with the audio properties of the predetermined zone of the relative location.

Generally, in one aspect, a method for initiating an action is provided. The method includes calculating a location of a first device relative to a second device. The location is calculated based on a wave signal transmitted from one of the first device or the second device to the other of the first device or the second device. Calculating the location of the first device relative to the second device may be performed by the first device. The first device may include an antenna array. The second device may include an antenna array.

The method further includes determining a zone status of the first device. The zone status is determined based on the location of the first device relative to the second device and a predetermined zone. The predetermined zone may be one of a plurality of predetermined zones, wherein each of the plurality of predetermined zones corresponds to one of a plurality of actions, and wherein each of the plurality of actions are unique. In one example, at least two of the plurality of predetermined zones may overlap. Alternatively, the plurality of the predetermined zones may be nonoverlapping.

According to an example, the zone status corresponds to the first device entering the predetermined zone. Alternatively, the zone status may correspond to the first device leaving the predetermined zone.

The method further includes initiating an action based on the zone status. According to an example, the action initiates a Bluetooth connection between the first device and the second device. In one example, the Bluetooth connection may be a Connected Isochronous Stream (CIS). According to another example, the action may request a broadcast code from the second device. The second device may transmit the broadcast code to the first device based on the zone status.

According to a further example, the action may be at least one of selecting a channel for audio playback, modifying an equalizer setting of the audio playback, and modifying a volume level of the audio playback.

According to an example, the wave signal is embedded in an advertisement packet. The advertisement packet includes an advertisement protocol data unit (PDU). The predetermined zone may be defined by coordinates embedded in the advertisement PDU. Further, the predetermined zone may be further defined by a coordinate format header embedded in the advertisement PDU.

According to an example, the first device is a wireless audio device. Further to this example, the advertisement PDU includes an announcement. The announcement may correspond to a broadcast isochronous stream (BIS). The action may initiate playback of audio corresponding to the BIS. The audio may be one portion of a continuous loop. The BIS may include metadata indicating that only the one portion of the continuous loop is played back. In other examples, the BIS includes metadata corresponding to at least one audio channel to be played back by the first device, an additional BIS corresponding to the predetermined zone, or a transition BIS corresponding to a second predetermined zone.

Generally, in another aspect, a first device is provided. The first device includes a Bluetooth receiver. The Bluetooth receiver is configured to receive a wave signal transmitted by a second device. The first device further includes a processor. The processor is configured to calculate a location of the first device relative to the second device based on the wave signal. The processor is further configured to determine a zone status of the first device based on the location of the first device relative to the second device and a predetermined zone. The processor is further configured to initiate an action based on the zone status.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

DETAILED DESCRIPTION

The present disclosure provides systems, devices, and methods for initiating an action based on the location of a first device (such as a wireless device) relative to a second device (such as a source device). In some examples, the first device is a peripheral device, while the second device is a central device. The wireless device includes a Bluetooth receiver configured to receive an advertisement packet transmitted by the source device. The advertisement packet includes an advertisement protocol data unit (PDU) and wave signal, such as a radio frequency (RF) tone. The system determines the relative location of the wireless device from the source device. The system then determines if the relative location is within a predetermined zone. The predetermined zone is defined by a set of coordinates embedded within the advertisement PDU. The advertisement PDU may also include a coordinate format header defining the format of the coordinates, such as rectangular or polar. The system then determines the zone status of the wireless device relative to the predetermined zone. The zone status may indicate, among other parameters, whether or not the wireless device is located within the predetermined zone. If this zone status indicates the wireless device is within the predetermined zone, the wireless device initiates an action, such as playing audio, forming a wireless connection, transmitting data, etc. Alternatively, if the zone status indicates the wireless device is within the predetermined zone, the wireless device may prevent an action from occurring. In this way, the predetermined zone replaces the induction loop cable used in conducted loop technology, as the coordinates and coordinate format header of the predetermined zone correspond to the physical dimensions and location of the induction loop cable.

Figure 1:
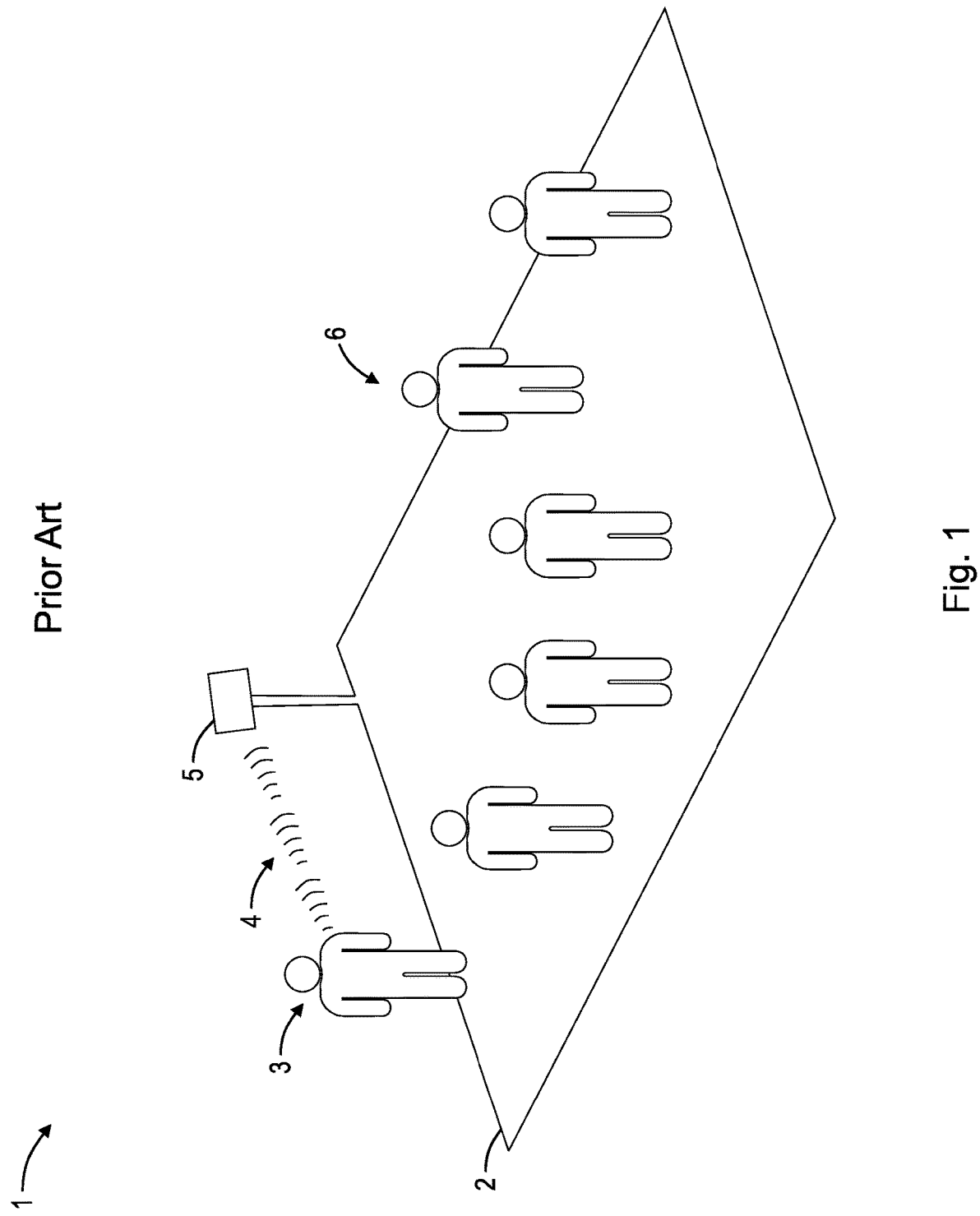
FIG. 1 is an illustration of a prior art conducted loop system, according to an example.

FIG. 1 shows an example of a prior art conducted loop system 1. In this example, five individuals 6 are observing a lecture given by speaker 3. Audio from speaker 3 is captured by a microphone (not shown) or other device and transmitted to a sound system 5 via a wireless connection 4. The sound system 5 is electrically coupled to an induction loop cable 2. The sound system 5 provides the induction loop cable 2 with an audio signal corresponding to the audio captured by the microphone and received by the sound system 5. The induction loop cable 2 then radiates the audio signal received from the sound system 5. This radiated audio data may then be received by wireless audio devices (not shown), such as hearing aids, audio headsets, earbuds, etc., worn by the individuals 6 positioned within the induction loop cable 2. In this way, individuals 6 positioned within the induction loop cable 2 may hear amplified audio directly from the sound system 5, without the distortions and/or background noise of their environment. However, using a conducted loop system 1 requires physical installation of an induction loop cable 2, limiting the configurability and the flexibility of the conducted loop system 1.

Figure 2B:
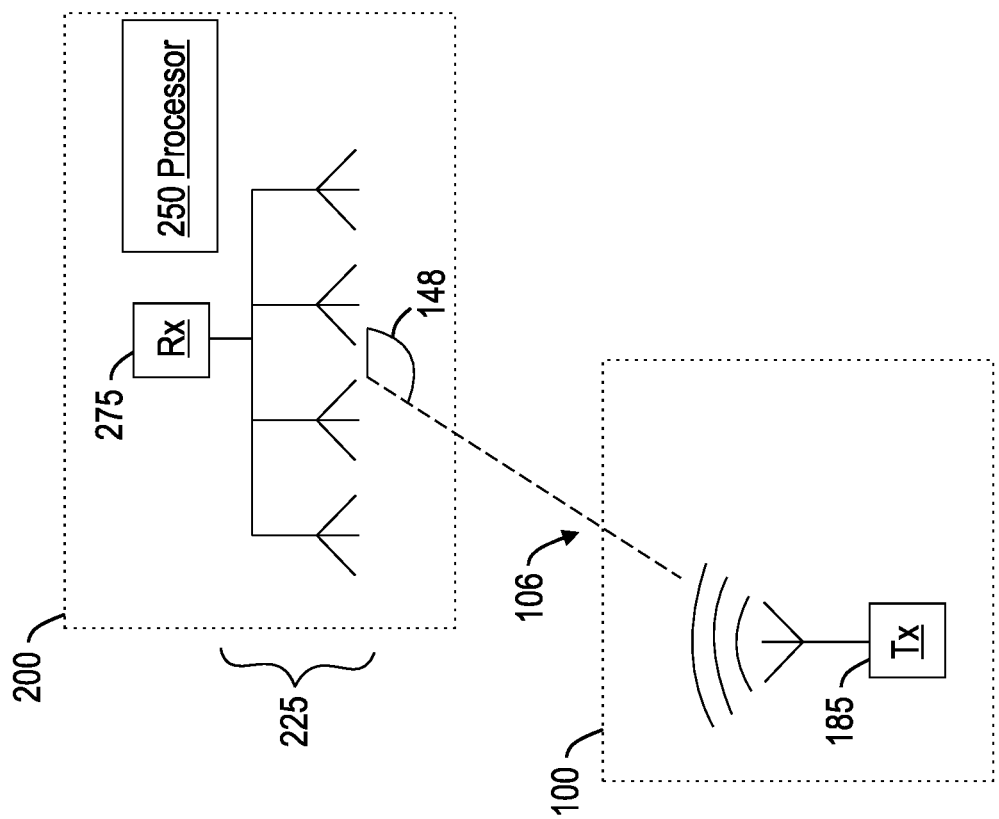
FIG. 2B is an illustration of an angle of arrival (AOA) calculation, according to an example.
Figure 2A:
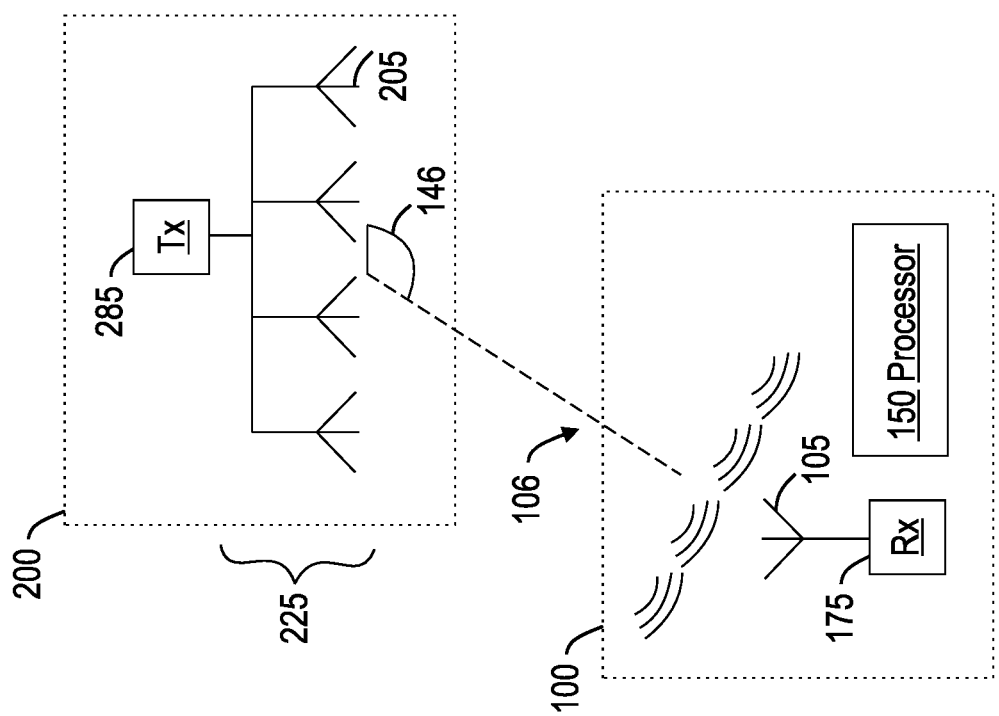
FIG. 2A is an illustration of an angle of departure (AOD) calculation, according to an example.

FIGS. 2A and 2B illustrate methods of calculating the relative location 102 of a first device 100 (such as a wireless device) relative to a second device 200 (such as a source device). The wireless device 100 and source device 200 may be any devices configured to receive and/or transmit wireless communication. For example, the wireless device 100 may be a hearing aid, audio headset, earbud, audio speaker, etc. Similarly, the source device 200 may be a sound system, a soundbar, a television, a personal computer, a smartphone, etc.

FIG. 2A illustrates a configuration for determining the relative location 102 of the wireless device 100 via Angle of Departure (AOD) 146 estimation. In AOD 146 estimation, the source device 100 includes a transmitter 285, such as a Bluetooth transmitter, a processor 250 and a plurality of antennas 205 forming an antenna array 225. The transmitter 285 of source device 200 transmits, via the antennas 205 of the antenna array 225, a wave signal 106, such as an RF tone. As shown in the example of FIG. 2A, each of the four antennas 205 of the antenna array 225 transmits a portion of the wave signal 106. This wave signal 106 is received by the wireless device 100, which includes an antenna 105, a processor 150, and a receiver 175. The processor 150 of the wireless device 100 then calculates the relative location 102 of the wireless device 100 based on the timing of the received wave signal 106.

Similarly, FIG. 2B illustrates a configuration for determining the relative location 102 of the wireless device 100 via Angle of Arrival (AOA) 148 estimation. In AOA 148 estimation, the wireless device 100 includes a transmitter 185, such as a Bluetooth transmitter, a processor 150 and antennas 285 forming an antenna array 225. The transmitter 185 of the wireless device 100 transmits, via the antenna 185, a wave signal 106. This wave signal 106 is received by the source device 200, which includes a plurality of antennas 205 forming antenna array 225, a processor 250, and a receiver 275. As shown in the example of FIG. 2B, each of the four antennas 205 of the antenna array 225 receives the wave signal 106. The processor 250 of the source device 200 then calculates the relative location 102 of the wireless device 100 based on the timing of the received wave signal 106. The relative location 102 may then be provided to the wireless device 100 for further processing.

In further examples, the wireless device 100 may include a plurality of antennas 105 forming an antenna array 125. While an antenna array 125 may be impractical in more compact wireless devices 100, such as earbuds or hearing aids, larger wireless devices 100, such as portable speakers, may have the capacity to include an antenna array 125. If the wireless device 100 includes the antenna array 125, the wireless device 106 may transmit wave signal 106 using the plurality of antennas 105 such that the source device 200 may determine the relative location 102 of the wireless device 100 via AOD 146 estimation. Similarly, the source device 200 may use a single antenna 205 to transmit the wave signal 106 to the antenna array 125 of the wireless device 100, such that the wireless device 100 may determine the relative location 102 of the wireless device 100 via AOA 148 estimation.

In further examples, the relative location 102 of the wireless device 100 may be determined using other techniques, such as High Accuracy Distance Measurement (HADM). HADM may be used as an alternative to AOA 144 or AOD 146 estimation when a Bluetooth connection exists between the wireless device 100 and the source device 200. In HADM, a symbol pattern is "reflected" between the devices 100, 200, and a round-trip time is used to calculate the distance between the devices 100, 200.

In a further example, a source device 200, such as a soundbar, may include a first transmitter 285a and a second transmitter 285b. The transmitters 285a, 285b may be arranged at opposite ends of the soundbar. Accordingly, a wireless device 100, such as an earbud, may use HADM to determine the distance from each transmitter 285a, 285b to the soundbar. The earbud may then determine its relative location 102 from the soundbar by triangulating the two determined distances.

Figure 3:
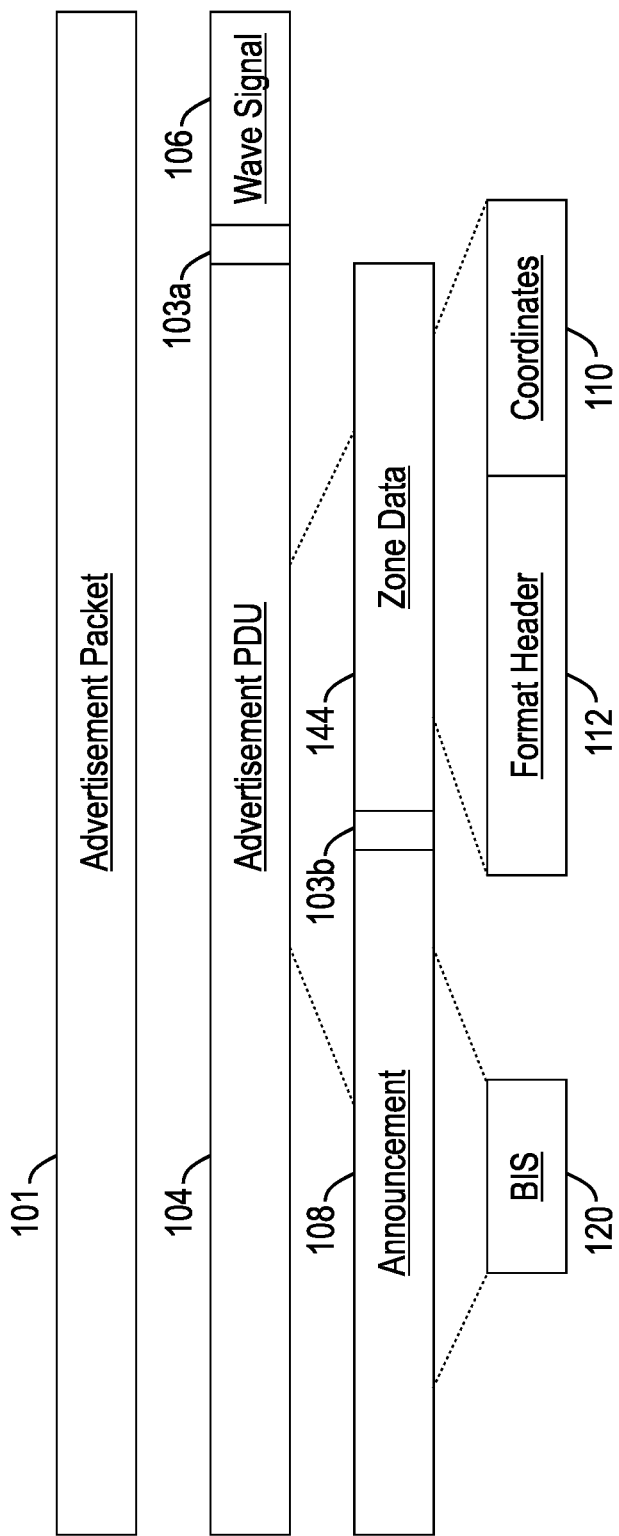
FIG. 3 is a diagram of a Bluetooth advertisement packet, according to an example.

FIG. 3 is a diagram of an example of an advertisement packet 101, such as a Bluetooth advertisement packet, transmitted from the source device 200 to the wireless device 100. In this example, the wireless device 100 may be considered a peripheral device, while the source device 200 may be considered a central device, as defined by Bluetooth standards and/or specifications. The advertisement packet 101 includes at least an advertisement PDU 104 and a wave signal 106. In the data structure of the advertisement packet 101, the advertisement PDU 104 and the wave signal 106 may be separated by data 103a. Other types of data included in the advertisement packet 101 may include a preamble, an access-address, and a cyclic redundancy check (CRC) code. As described above with reference to FIGS. 2A and 2B, the wave signal 106, such as an RF tone embodied as a sine wave, is used to determine the relative location 102 of the wireless device 100 with respect to the source device 200 using AOD 146 or AOA 148 estimation.

The advertisement PDU 104 includes at least two types of data, an announcement 104 and zone data 144. In the data structure of the advertisement PDU 104, the announcement 108 and the zone data 144 may be separated by data 103b. In this example, the announcement 108 includes information to enable the wireless device 100 to receive data from a Bluetooth Low Energy (LE) Audio Broadcast Isochronous Stream (BIS) 120. The BIS 120 can also be transmitted by the source device 200, and received by any device configured according to the announcement 108. In other example, the announcement 108 may include additional information to facilitate other types of Bluetooth communication, such as Connected Isochronous Steam (CIS). In some cases, the announcement 108 may also contain one or more action commands 164. These action commands 164 instruct the wireless device 100 to perform one or more actions 118, such as form 134 a Bluetooth connection with the source device 200, select 138 an audio channel for output, modify 140 equalizer settings, modify 140 output volume settings, and/or playback 160 audio. In some cases, the action commands 164 may also instruct the device to not perform or cease performing an action 118. For example, the action command 164 could instruct the wireless device 100 to not playback audio.

The zone data 144 defines the shape and size of a corresponding predetermined zone 116. The zone data 144 includes a set of coordinates 110 defining the boundaries of the predetermined zone 116, as well as a coordinate format header 112 defining the format (such as rectangular or polar) of the coordinates 110. The coordinates 110 may be defined relative to the source device 200; for example, the (0, 0) reference point of a coordinate system may be located at the center the source device 200.

Figure 4:
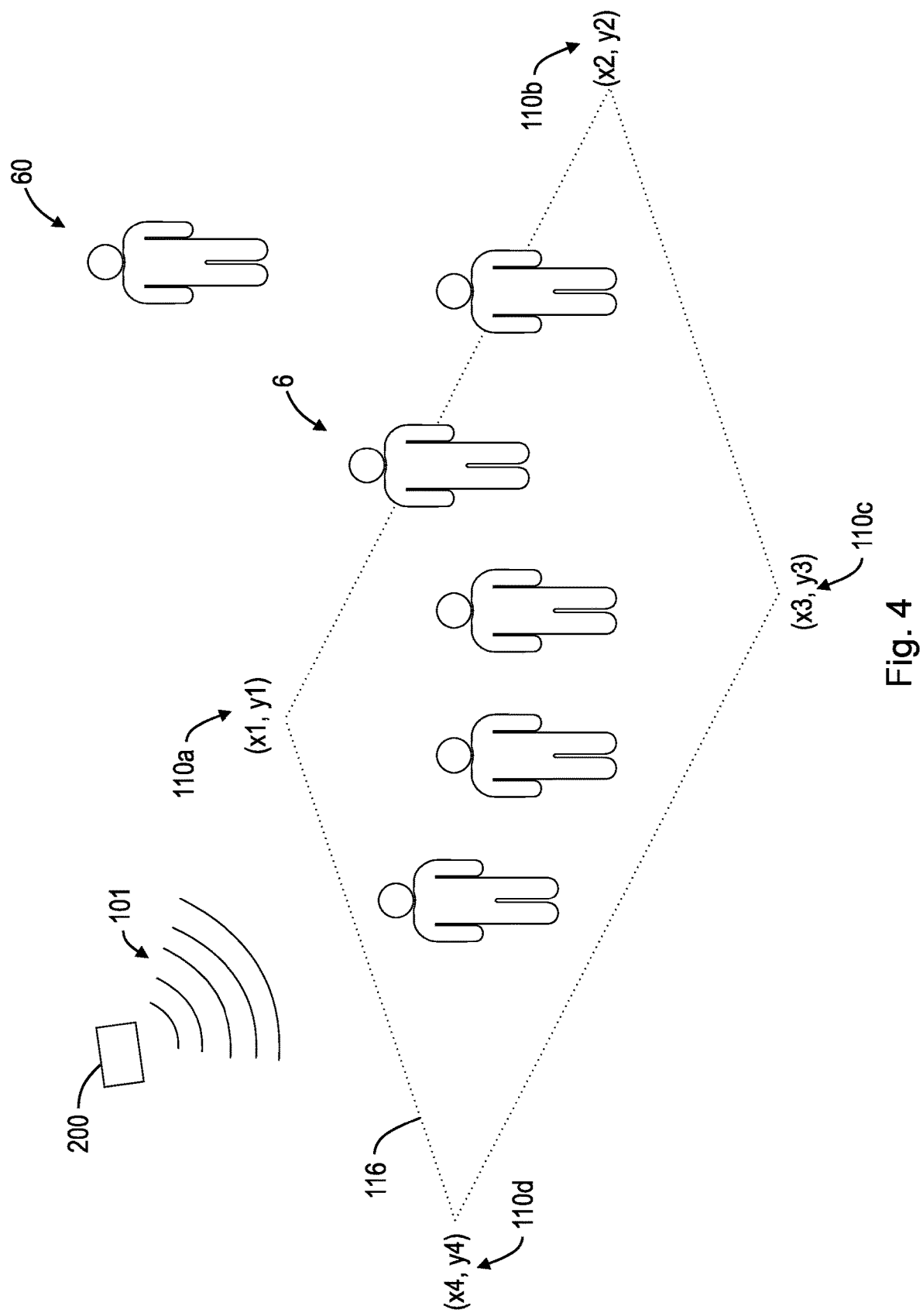
FIG. 4 is an illustration of a system for initiating a wireless device action, according to an example.

FIG. 4 illustrates the individuals 6 of FIG. 1 standing within predetermined zone 116. The size and shape of the predetermined zone 116 is defined by coordinates 110a, 110b, 110c, 110d. The coordinates 110a, 110b, 110c, 110d are transmitted by source device 200 as part of the advertisement PDU 104 of advertisement packet 101 (as shown in FIG. 3). As shown in FIG. 4, the coordinates 110a, 110b, 110c, 110d are rectangular coordinates.

In the example of FIG. 4, the individuals 6, 60 are each wearing a wireless device 100 (not shown), such as a hearing aid. In this example, the wireless device 100 may be considered a peripheral device, while the source device 200 may be considered a central device. If the relative location 102 of the wireless device 100 is determined to be within the coordinates 110 as defined in the advertisement PDU 104 of advertisement packet 101, the processor of the wireless device 100 may initiate a wireless device action 118 corresponding to a BIS 120 referenced by announcement 108. In one example, the wireless device action 118 triggers an acoustic transducer 115 of the wireless audio device 100 to playback audio 122 corresponding to the BIS 120. Accordingly, the individuals 6 located within the predetermined zone 116 may be able to hear and amplify audio 122 originating directly from the source device 200 via their hearing aids with limited background noise and distortions. Conversely, the wireless device 100 of the individual 60 located outside the predetermined zone 116 may receive the BIS 120, but will not initiate a wireless device action 118 to playback the audio 122 corresponding to the BIS 120.

In a further example, this audio 122 can be one portion of a continuous loop 124. In this example, the BIS 120 may include metadata 126. This metadata 126 may indicate, to the processor 150 of the wireless device 100, to only play one portion of the continuous loop 124. This example may be particularly useful in locations such as airport terminals or subway stations, where the continuous loop 124 may include important information (such as departure times, luggage restrictions, etc.) continually provided to travelers. However, an individual traveler may only need to hear the information one time, and repetition of the same information may be irritating or distracting. This may be implemented by incorporating playback start and stop data or playback start and duration data within the advertisement PDU 104. The processor 150 of the wireless device 10 may then use sequence numbers associated with the BIS 120 to align the start time position with the proper time in the continuous loop 124, enabling the processor 150 to disable playback once the stop time position or the playback duration has been reached.

In further examples, the wireless device action 118 can incorporate alternative or additional actions, such as selecting 138 a channel for audio playback, modifying 140 an equalizer setting of the audio playback, and/or modifying 142 a volume level of the audio playback. For example, an environment may include several predetermined zones 116 configured to trigger a wireless device 100 to playback audio 160 of the same BIS 120. However, it may be advantageous to customize the audio output of each zone. For example, if a predetermined zone 116 is positioned to the right of a stereo sound system transmitting a BIS 120, the wireless device action 118 may cause the wireless device 100 to only play audio corresponding to the right audio channel of the BIS 120. This example is explained in further detail with regarding to FIG. 8.

Figure 5:
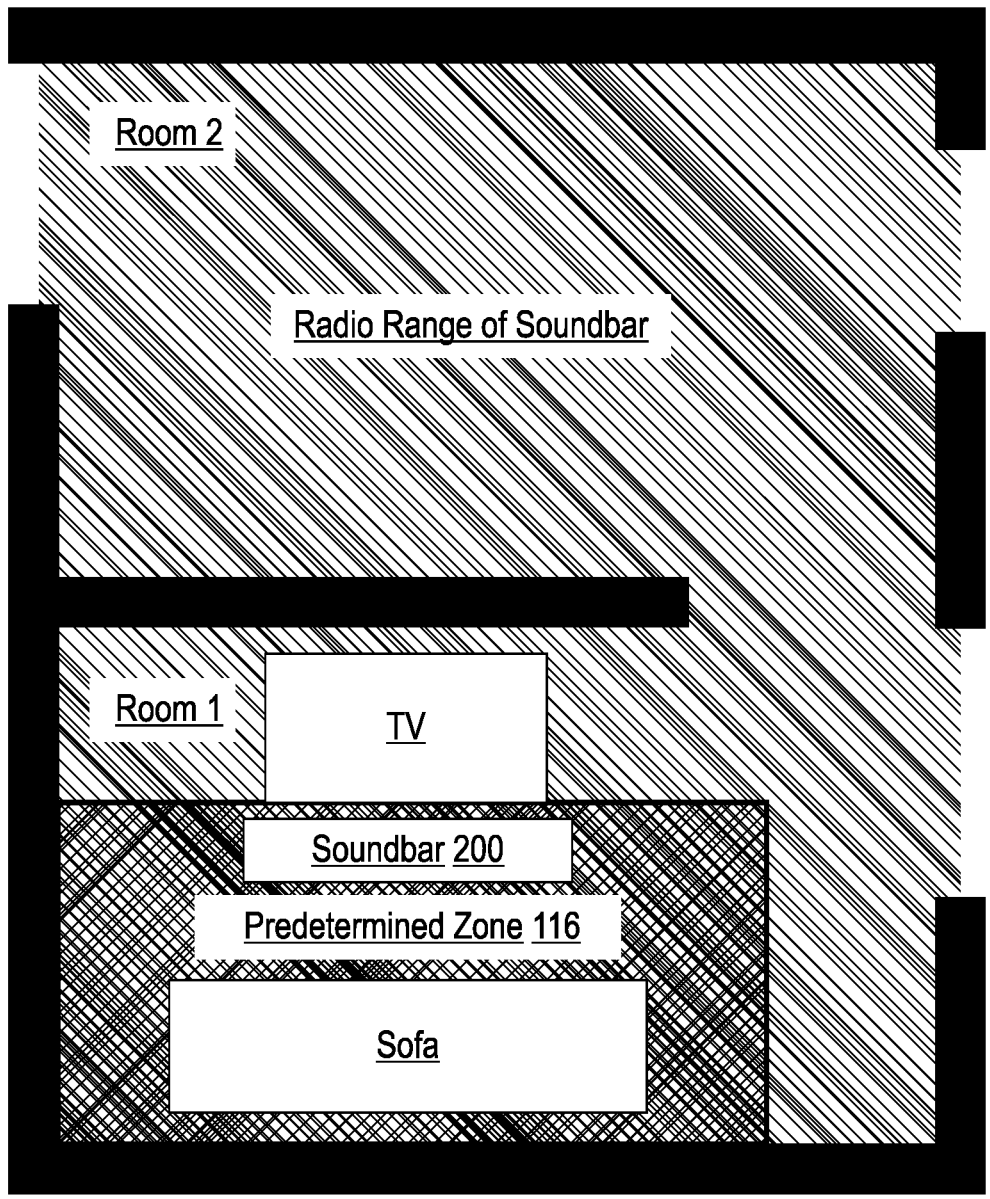
FIG. 5 is a floor plan depicting an implementation of the system for initiating a wireless device action, according to an example.

FIG. 5 illustrates a home audio implementation of the aforementioned system. FIG. 5 depicts a floor plan with two rooms, Room 1 and Room 2. Room 1 includes a television, a sofa, and a source device 200 embodied as a soundbar. In this example, the soundbar 200 transmits a BIS 120 corresponding to audio received from the television. The soundbar 200 has a radio range covering the entirety of both Room 1 and Room 2, meaning that a wireless device 100 in Room 2 would be capable of receiving the BIS 120. However, it would be undesirable to hear audio 122 corresponding to the BIS 120 in areas of Room 1 and Room 2 out of view of the television. Accordingly, the soundbar 200 transmits an advertisement packet 101. The advertisement packet 101 includes advertisement PDU 104 with coordinates 110 defining the dimensions of predetermined zone 116. As can be seen in FIG. 5, the predetermined zone 116 is limited to the portion of Room 1 capable of viewing the television. Therefore, wireless devices 100 within the predetermined zone 116, such as those located on or near the sofa, may automatically playback audio 122 corresponding to the BIS 120 transmitted by the soundbar 200. However, wireless devices 100 outside of the predetermined zone 116, such as those located in Room 2, will not playback the audio 122.

Figure 6:
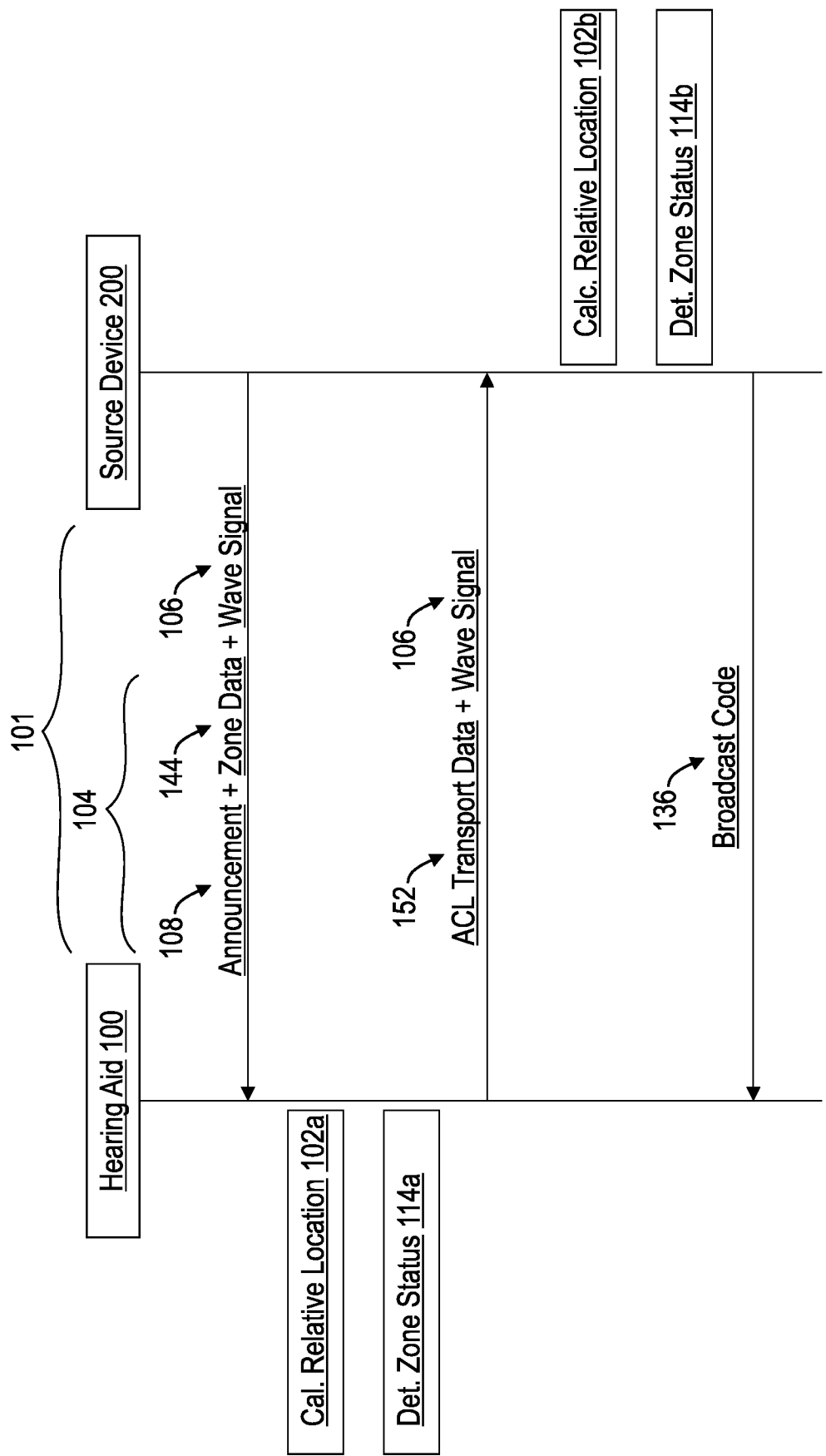
FIG. 6 is a flow diagram of a method for providing a broadcast code to a wireless device, according to an example.

FIG. 6 is a flow diagram of a method for providing a broadcast code 136 to a wireless device 100 within the predetermined zone 116. In some examples, the BIS 120 transmitted by the source device 200 may be encrypted. The wireless device 100 receiving the BIS 120 may then require a broadcast code 136 to decrypt the encrypted BIS 120 to enable audio 122 playback. An encrypted BIS 120 may be implemented in certain scenarios requiring a degree of privacy between the source device 200 and the wireless device 100, such as during a bank transaction. In this example, the predetermined zone 116 may be defined as the area immediately in front of a bank teller station or an automated teller machine (ATM). Encrypting the BIS 120 will prevent nearby devices outside of the predetermined zone 116 from eavesdropping on the BIS 120.

As shown in FIG. 6, a source device 200, such as an ATM, transmits an advertisement packet 101. The advertisement packet 101 includes an advertisement PDU 104 and a wave signal 106. The advertisement PDU 104 includes an announcement 108 corresponding to an encrypted BIS 120 and zone data 144. The advertisement packet 101 is received by a wireless device 100, embodied in FIG. 6 by a hearing aid. The hearing aid 100 is worn by an individual within a predetermined zone 116 defined by the coordinates 110 and coordinate format header 112 of the transmitted zone data 144. In this example, the predetermined zone 116 may be arranged immediately in front of the ATM, while the encrypted BIS 120 conveys audio 122 corresponding to the ATM.

Upon receiving the advertisement packet 101 including the wave signal 106, the processor 150 of the hearing aid 100 is able to determine the relative location 102*a* of the hearing aid 100 through AOD 146 estimation. The processor 150 of the hearing aid 100 then determines the zone status 114*a* of the hearing aid by comparing the relative location 102 to the predetermined zone 116 as defined by the zone data 144. If the zone status 114*a* indicates that the hearing aid 100 is within the predetermined zone 116, the processor 150 configures the wireless device 100 to transmit the wave signal 106 and Asynchronous Connection-Oriented Logical Transport (ACL transport) data 152. The ACL transport data 152 is used to facilitate ACL communication between the hearing aid 100 and the source device 200.

The ACL transport data 152 and the wave signal 106 are received by the source device 200. The processor 250 of the source device 200 determines the relative location 102*b* of the hearing aid 100 through AOA 148 estimation. The processor 250 of the source device 200 then determines the zone status 114*b* of the hearing aid 100 by comparing the relative location 102 to the predetermined zone 116 as defined by the zone data 144. If the zone status 114*b* indicates that the hearing aid 100 is within the predetermined zone 116, the processor 150 configures the wireless device 100 to transmit the broadcast code 136 to the hearing aid 100 via ACL transport. Upon receiving the broadcast code 136, the hearing aid 100 is then able to decrypt the encrypted BIS 120, and playback audio 122 from the ATM. In this way, the relative location 102 of the hearing aid 100 is determined twice, once to enable ACL communication between the hearing aid 100 and the source device 200, and once to transmit the broadcast code 136 from the source device 200 to the hearing aid 100 via ACL protocol.

Figure 7:
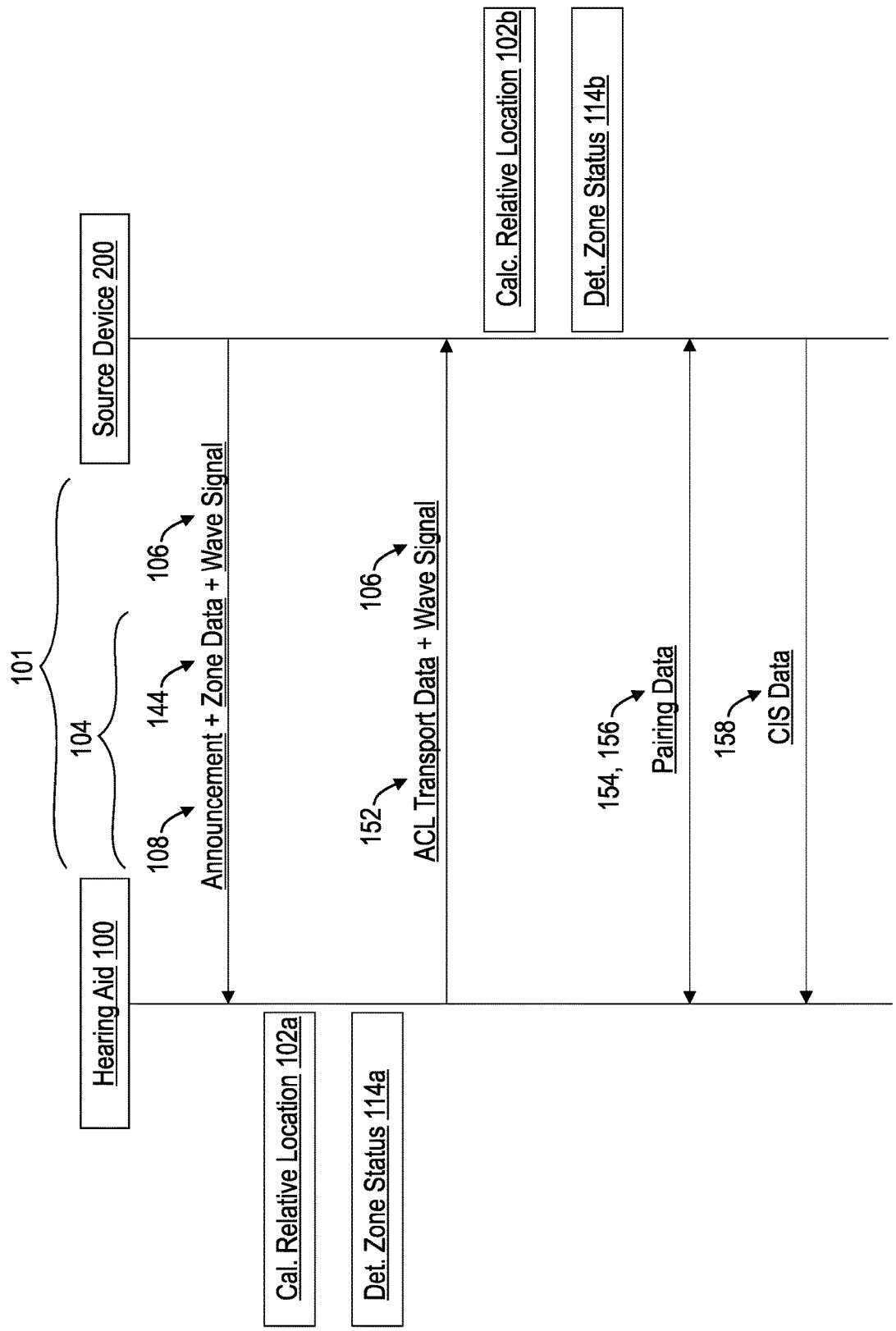
FIG. 7 is a flow diagram of a method for forming a Connected Isochronous Stream (CIS) connection between a wireless device and a source device, according to an example.

FIG. 7 illustrates how the communication architecture of FIG. 6 can be modified to form a Bluetooth connection, such as a Connected Isochronous Stream (CIS), between the hearing aid 100 and the source device 200. This architecture may be used in similar environments as described with respect to FIG. 6 (such as banks) to avoid eavesdropping.

As shown in FIG. 7, the source device 200, such as an ATM, transmits an advertisement packet 101. The advertisement packet 101 includes an advertisement PDU 104 and a wave signal 106. The advertisement PDU 104 includes an announcement 108, zone data 144, and a wave signal 106. The advertisement packet 101 is received by a wireless device 100, embodied in FIG. 7 by a hearing aid. As in FIG. 6, the hearing aid 100 is worn by an individual within a predetermined zone 116 defined by the coordinates 110 and coordinate format header 112 of the transmitted zone data 144. In this example, the predetermined zone 116 may be arranged immediately in front of the ATM, while the CIS conveys audio 122 corresponding to the ATM.

Upon receiving the advertisement packet 101 including the wave signal 106, the processor 150 of the hearing aid 100 is able to determine the relative location 102*a* of the hearing aid 100 through AOD 146 estimation. The processor 150 of the hearing aid then determines the zone status 114*a* of the hearing aid by comparing the relative location 102 to the predetermined zone 116 as defined by the zone data 144. If the zone status 114*a* indicates that the hearing aid 100 is within the predetermined zone 116, the processor 150 configures the wireless device 100 to transmit the wave signal 106 and ACL transport data 152. The ACL transport data 152 is used to facilitate ACL communication between the hearing aid 100 and the source device 200.

The ACL protocol data 152 and the wave signal 106 are received by the source device 200. The processor 250 of the source device 200 is able to determine the relative location 102*b* of the hearing aid 100 through AOA 148 estimation. The processor 250 of the source device 200 then determines the zone status 114*b* of the hearing aid 100 by comparing the relative location 102 to the predetermined zone 116 as defined by the zone data 144. If the zone status 114*b* indicates that the hearing aid 100 is within the predetermined zone 116, the processor 150 configures the hearing aid 100 to exchange pairing information 154, 156 with the source device 200 via ACL communication. Once paired, the source device 200 provides CIS data 158 to the hearing aid 100 to form a CIS between the source device 200 and the hearing aid 100.

In some examples, the CIS formed between the hearing aid 100 and the source device 200 is unidirectional, such as from the source device 200 to the hearing aid 100. In other examples, the CIS may be bidirectional. Further, while the data conveyed by the CIS may be audio data in the aforementioned example, in other examples, the CIS may convey any type of applicable data.

Figure 8:
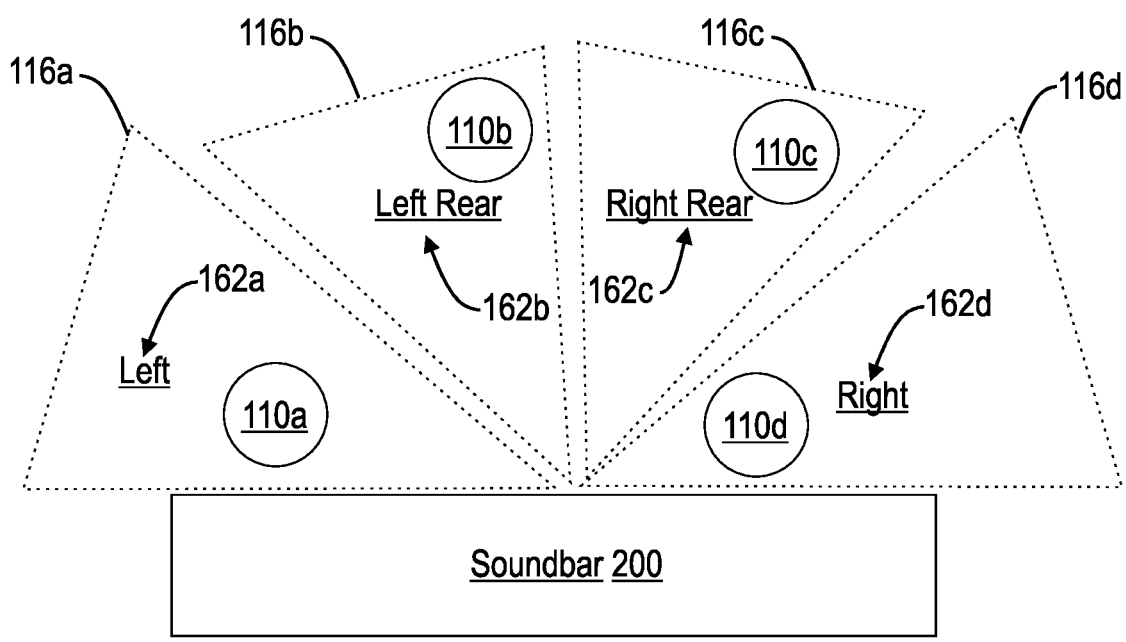
FIG. 8 is an illustration of a surround sound system, according to an example.

FIG. 8 illustrates an implementation of systems and methods for initiating wireless device actions 118 in a surround sound system. As shown in FIG. 8, four wireless devices 100*a*, 100*b*, 100*c*, 100*d*, embodied as portable speakers, are placed around source device 200, embodied as a soundbar. Each of the portable speakers 100*a*, 100*b*, 100*c*, 100*d* is positioned in a corresponding predetermined zone 116*a*, 116*b*, 116*c*, 116*d*. Each predetermined zone 116*a*, 116*b*, 116*c*, 116*d* is associated with an audio channel 162 of a BIS 120. For example, predetermined zone 116*a* is associated with the left audio channel 162*a* of the BIS 120, and predetermined zone 116*d* is associated with the right audio channel 162*d* of the BIS 120. Further, predetermined zone 116*b* is associated with the left rear audio channel 162*b*, while predetermined zone 116*c* is associated with the right rear audio channel 162*c* of the BIS 120. As described below, a portable speaker 100 positioned within one of the predetermined zones 116 will automatically play audio corresponding to the audio channel selection 138 of the predetermined zone 116. In this way, an user can easily configure a surround sound system simply by placing the portable speakers 110*a*, 100*b*, 100*c*, 100*d* in the appropriate predetermined zones 116*a*, 116*b*, 116*c*, 116*d*. In some examples, one of more of the predetermined zones 116 may be associated with more than one audio channel 162.

The soundbar 200 is configured to transmit a series of advertisement packets 101 received by each of the portable speakers 100*a*, 100*b*, 100*c*, 100*d*. Each of the advertisement packets 101 includes an advertisement PDU 104 and a wave signal 106. Each advertisement PDU 104 includes an announcement 108 corresponding to a BIS 120 and zone data 144. The announcement 108 further includes information regarding one or more audio channels 162. For instance, a first advertisement PDU 104*a* may include zone data 144*a* defining predetermined zone 116*a*. A first advertisement PDU 104*a* may then also include an announcement 108*a* comprising audio channel selection data corresponding to the left-audio channel 162*a*.

Each processor 150 of each of the speakers 100 is configured to determine its relative location 102 based on AOD 146 estimation. If the processor 150 then determines the speaker 100 is within the predetermined zone 116 corresponding to the transmitted zone data 144, the speaker plays an audio channel 162 corresponding to the audio channel selection data of the announcement 108. For example, once the processor 150*a* of the speaker 110*a* has determined that it is positioned within predetermined zone 116*a*, as defined by zone data 144*a*, the processor initiates a wireless device action 118 to playback audio 122 corresponding to the identified left audio channel 162*a* of the BIS 120.

Figure 9:
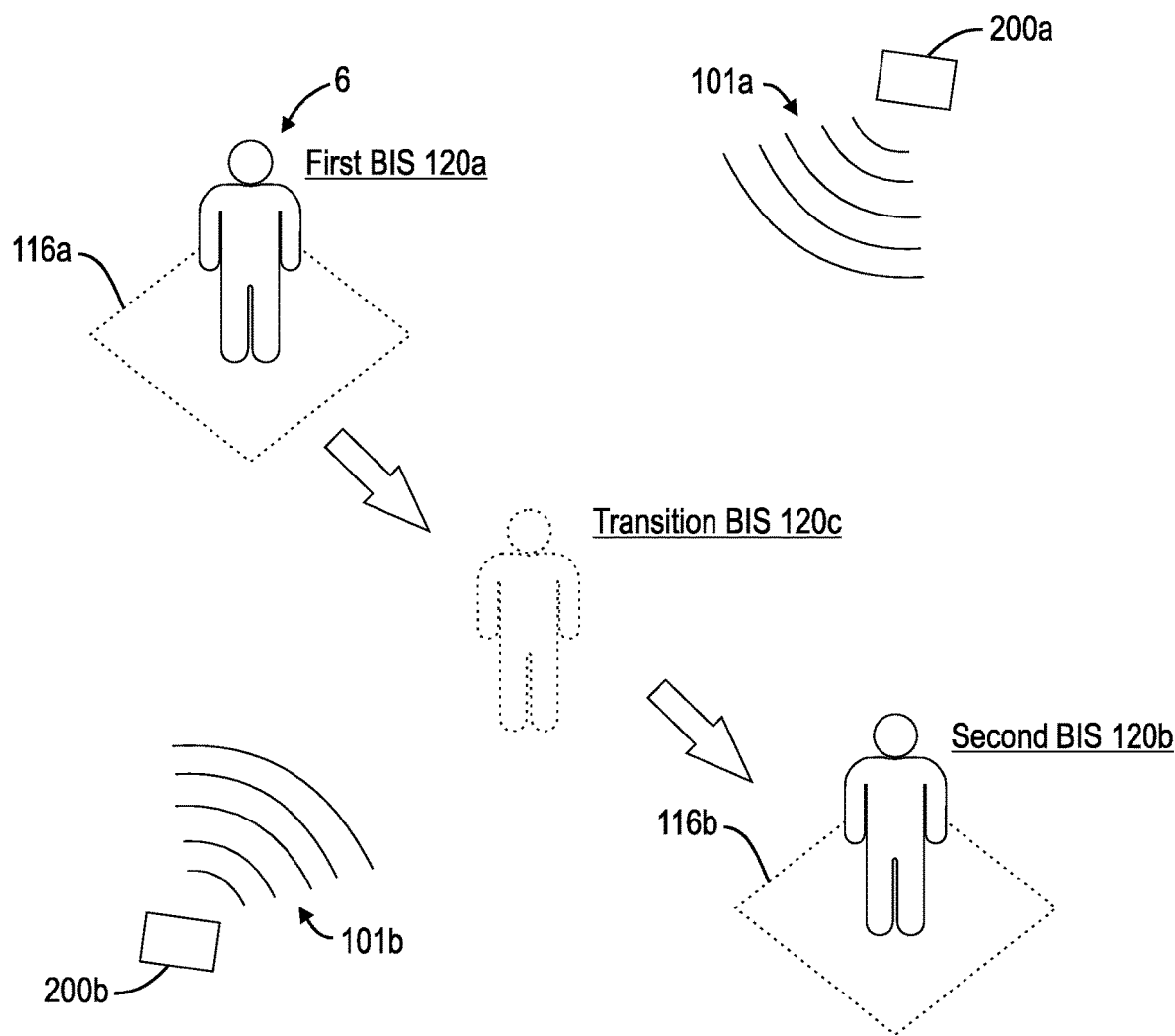
FIG. 9 is an illustration of a system for initiating a wireless device action with multiple predetermined zones, according to an example.

FIG. 9 illustrates an individual 6 moving from a first predetermined zone 116*a* to a second predetermined zone 116*b*. In this example, the individual 6 may be walking through an airport, and the different predetermined zones 116*a*, 116*b* may correspond to different sections of the airport, such as terminals, gates, security checkpoints, ground transportation, baggage claim, etc. In this example, the individual 6 is wearing a wireless device 100 (not shown), such as a hearing aid. The airport environment also includes a first source device 200*a* and a second source device 200*b*. Notably, the hearing aid 100 will receive a first advertisement packet 101*a* from the first source device 200*a* and a second advertisement packet 101*b* from the second source device 200*b* throughout the environment. However, the wireless device actions 118 taken by the hearing aid 100 (such as audio playback of a first BIS 120*a*, audio playback of a second BIS 120*b*, and/or audio playback of a transition BIS 120*c*) are dictated by the relative location 102 of the hearing aid 100 and the predetermined zones 116*a*, 116*b*.

As described above, the individual 6 enters predetermined zone 116*a* while the wireless device 100 receives a first advertisement packet 101*a* from the first source device 200*a*. The first advertisement packet 101*a* includes a first advertisement PDU 104*a*. The first advertisement PDU 104*a* includes first zone data 144*a* corresponding to the predetermined zone 116*a*, as well as a first announcement 108*a* corresponding to first BIS 120*a*. Accordingly, once the individual 6 (and therefore the hearing aid 100) enters the predetermined zone 116*a*, the processor 150 of the hearing aid 100 initiates a wireless device action 118*a*, such as playing audio 122*a* corresponding to the first BIS 120*a*. In the airport example, the first BIS 120*a* may provide information regarding a specific departure gate located near the first predetermined zone 116*a*. Notably, the first source device 200*a* continually transmits first advertisement packet 101*a*, enabling the processor 150 to determine if the hearing aid 100 has recently entered or left the predetermined zone 116*a*.

Once the individual 6 has exited the predetermined zone 116*a*, the processor 150 updates the zone status 114 of the hearing aid 100 to reflect this change of position. In one example, this change in zone status 114 will trigger a wireless device action 118 to stop audio playback of the first BIS 120*a* upon the individual 6 leaving the first predetermined zone 116*a*. In another example, the wireless device action 118 may both stop audio playback of the first BIS 120*a*, and then trigger audio playback of a transition BIS 120*c*. Continuing with the airport example, the transition BIS 120*c* may provide general airport or terminal information, such as gate changes or security reminders.

If the individual 6 then enters the second predetermined zone 116*b*, the wireless device receives a second advertisement packet 101*b* from a second source device 200*b*. The second advertisement packet 101*b* includes a second advertisement PDU 104*b*. The second advertisement PDU 104*b* includes second zone data 144*b* corresponding to the second predetermined zone 116*b*, as well as a second announcement 108*b* corresponding to second BIS 120*b*. Accordingly, once the individual 6 (and therefore the hearing aid 100) enters the predetermined zone 116*b*, the processor 150 of the hearing aid 100 initiates a wireless device action 118*b*, such as playing audio 122*b* corresponding to the second BIS 120*b*. The wireless device action 118*b* may also stop playback of any other audio 122*b*, such as audio 122*b* corresponding to the transition BIS 120*c*.

While the example of FIG. 9 illustrates two non-overlapping predetermined zones 116*a*, 116*b*, in some examples, the predetermined zones 116*a*, 116*b* may overlap, and the associated wireless device actions 118*a*, 118*b* may be configured to complement each other, such as (a) playing audio 122 corresponding to a BIS 120, and (b) modifying the volume of the playback audio.

Figure 10:
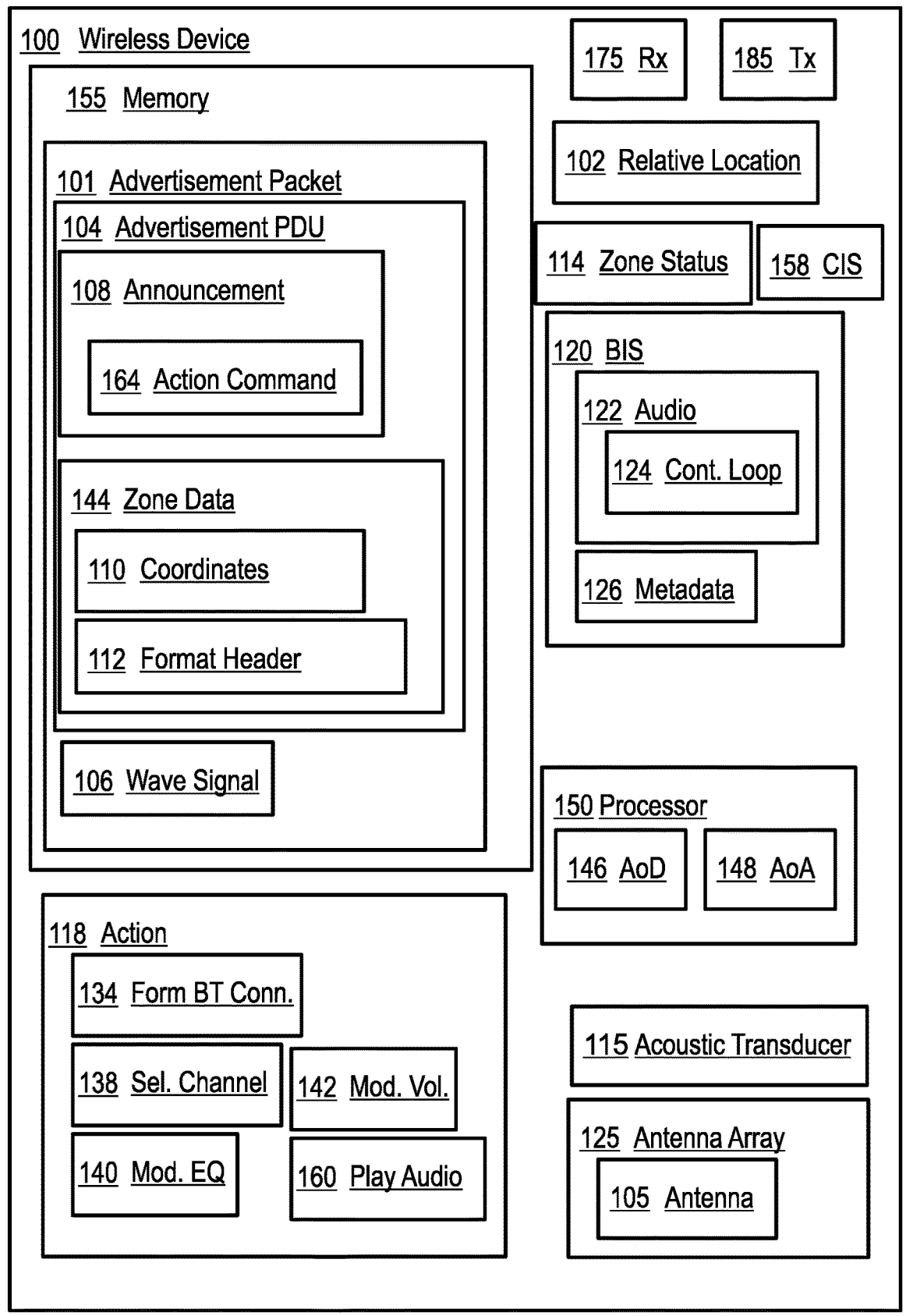
FIG. 10 is a schematic diagram of a wireless device, according to an example.

FIG. 10 shows a schematic representation of a wireless device 100. The wireless device 100 may be one of a wide variety of devices, such as a hearing aid, an earbud, an audio headset, a portable speaker, etc. In some examples, the wireless device 100 receives Bluetooth data transmitted from a source device 200 and plays audio 122 corresponding to the Bluetooth data. As shown in FIG. 10, the wireless device 100 includes an antenna array 125 with one or more antennas 105, an acoustic transducer 115, a processor 150, a memory 155, a receiver 175, and a transmitter 185. In some examples, the functionality of the receiver 175 and transmitter 185 may be combined in a transceiver. In some examples, the receiver 175 and transmitter 185 are capable of receiving and transmitting RF signals, such as a wave signal 106 used in AOD 146 or AOA 148 estimation, or RF carriers of Bluetooth data, such as Bluetooth data corresponding to broadcast streams or connected streams. The memory 155 is configured to store a wide array of data, including advertisement packets 101 received from a source device 200, the relative location 102 of the wireless device 102, the zone status 114 of the wireless device 100, and data corresponding to a BIS 120 or a CIS 158. The processor 150 is configured to determine the relative location 102 of the wireless device 100 using either AOD 146 or AOA estimation. Based on the zone status 114, the processor 150 may trigger one or more of a wide array of wireless device actions 118, such as forming 134 a Bluetooth connection, selecting 138 an audio channel, modifying 140 equalizer settings, modifying 142 volume level, or simply playing 160 audio, such as audio 122 corresponding to a BIS 120. An antenna array 125 may be impractical in more compact wireless devices 100, such as earbuds; in those cases, the wireless device 100 may simply use a single antenna 105. Larger wireless devices 100, such as portable speakers, may have the capacity to include an antenna array 125.

Figure 11:
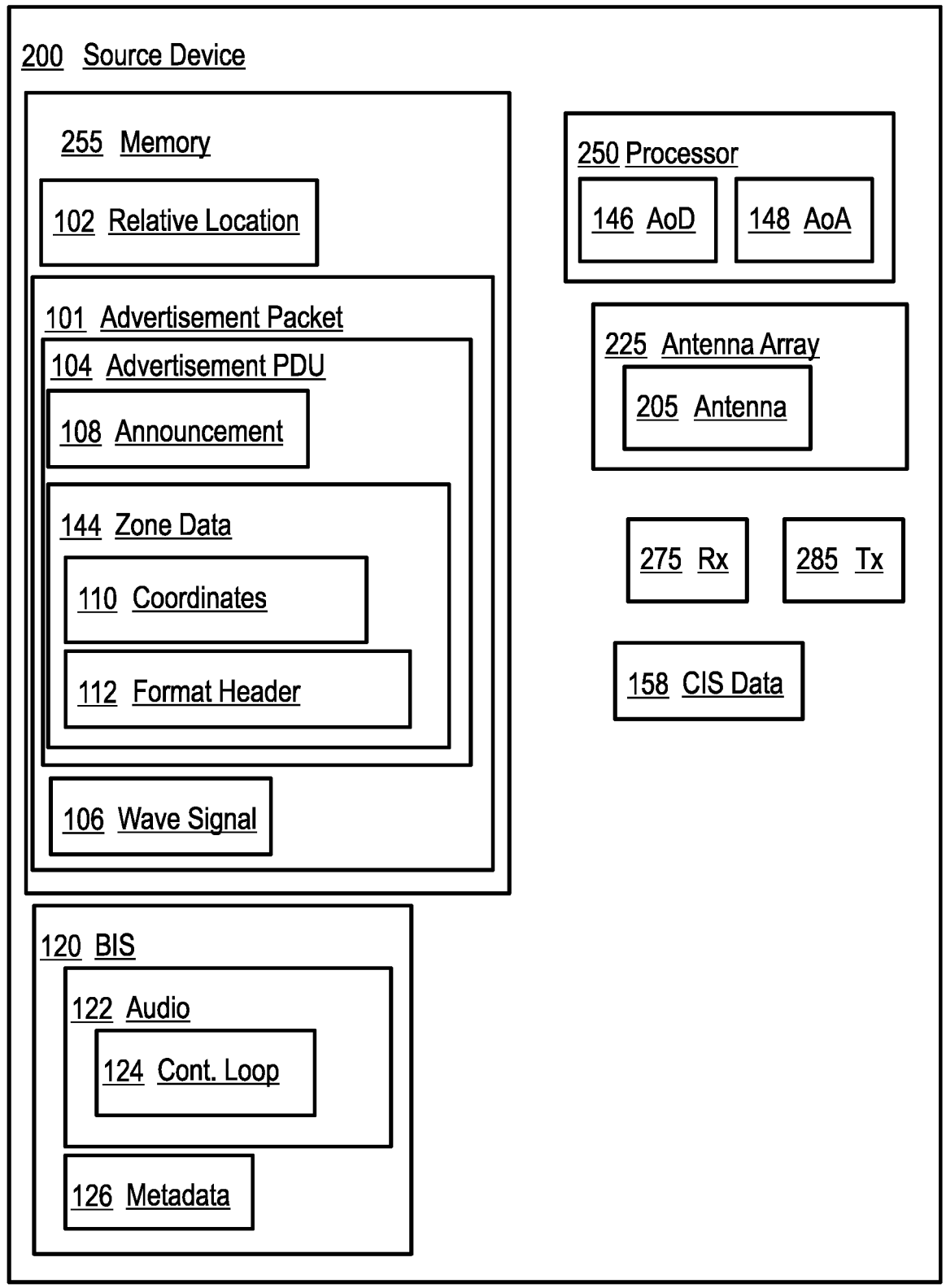
FIG. 11 is a schematic diagram of a source device, according to an example.

FIG. 11 shows a schematic representation of a source device 200. The wireless device 200 may be one of a wide variety of devices, such as a component of a sound system, a television, a soundbar, a smartphone, a personal computer, etc. As shown, the source device 200 includes an antenna array 225 with one or more antennas 205, a processor 250, a memory 255, a receiver 275, and a transmitter 285. In some examples, the functionality of the receiver 275 and transmitter 285 may be combined in a transceiver. In some examples, the receiver 275 and transmitter 285 are capable of receiving and transmitting RF signals, such as a wave signal 106 used in AOD 146 or AOA 148 estimation, or RF carriers of Bluetooth data, such as Bluetooth data corresponding to broadcast streams or connected streams. In some examples, the source device 200 transmits Bluetooth data such that the Bluetooth data may be received by a wireless device 100 within transmission range. The processor 250 may be configured to determine the relative location 102 of a wireless device 100 using either AOD 146 or AOA 148 estimation.

Figure 12:
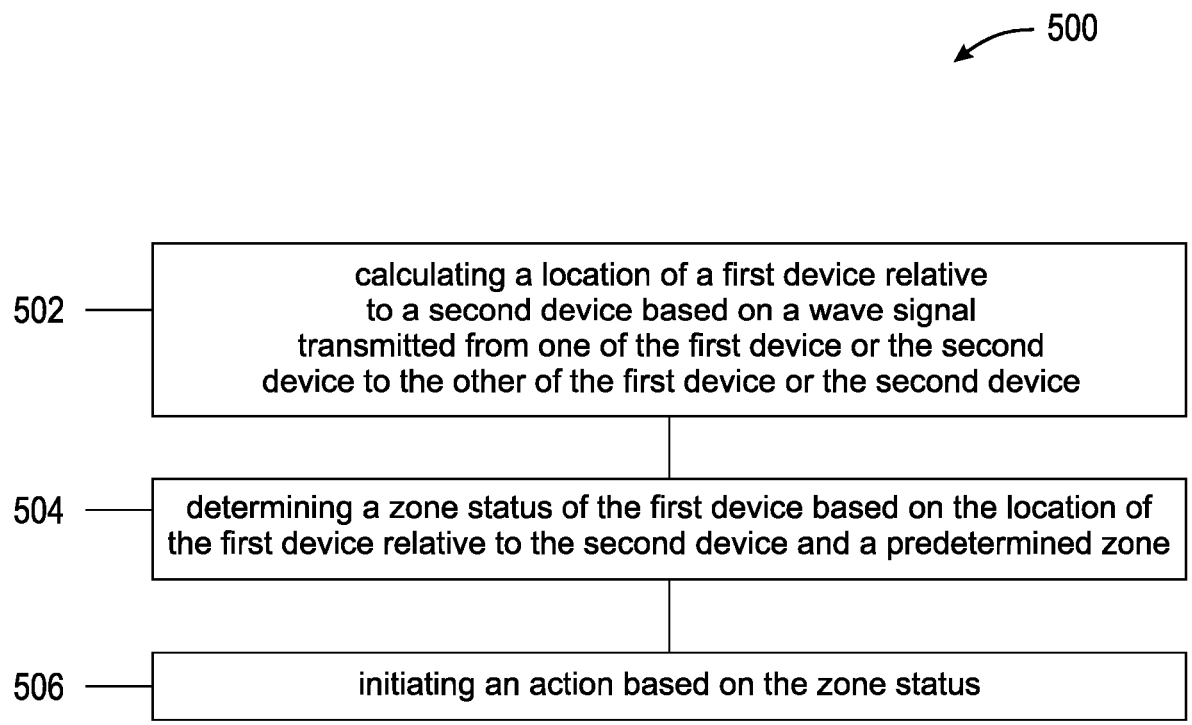
FIG. 12 is a flowchart of a method for initiating a wireless device action, according to an example.

FIG. 12 illustrates a method 500 for initiating a wireless device action. The method 500 includes calculating 502 a relative location of a wireless device from a source device. The relative location is calculated based on a wave signal embedded in the advertisement packet transmitted by the source device. The wireless device includes a Bluetooth receiver configured to receive an isochronous stream advertisement. The method 500 further includes determining 504 a zone status of the wireless device. The zone status is based on the relative location and a predetermined zone. The method 500 further includes initiating 506 a wireless device action based on the zone status.

FIG. 12 illustrated a method 500 for initiating an action. The method 500 includes calculating 502 a location of a first device relative to a second device based on a wave signal transmitted from one of the first device or the second device to the other of the first device or the second device. The method 500 further includes determining 504 a zone status of the first device based on the location of the first device relative to the second device and a predetermined zone. The method 500 further includes initiating an action based on the zone status.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
    calculating a location of a first device relative to a second device based on a wave signal transmitted from one of the first device or the second device to the other of the first device or the second device, wherein the first device is a wearable audio device;
    determining a zone status of the first device based on the location of the first device relative to the second device and a predetermined zone; and
    initiating an action based on the zone status, wherein the action comprises playing, via the first device, audio corresponding to a broadcast isochronous stream (BIS) provided by the second device if the zone status indicates that the first device is within the predetermined zone;
    and
    wherein the wave signal is embedded in an advertisement packet, wherein the advertisement packet comprises an advertisement protocol data unit (PDU), wherein the advertisement PDU comprises an announcement corresponding to the BIS, and wherein the predetermined zone is defined by coordinates embedded in the advertisement PDU.

2. The method of claim 1, wherein calculating the location of the first device relative to the second device is performed by the first device.

3. The method of claim 1, wherein the first device comprises an antenna array.

4. The method of claim 1, wherein the second device comprises an antenna array.

5. The method of claim 1, wherein the predetermined zone is one of a plurality of predetermined zones, wherein each of the plurality of predetermined zones corresponds to one of a plurality of actions, and wherein each of the plurality of actions are unique.

6. The method of claim 5, wherein at least two of the plurality of predetermined zones overlap.

7. The method of claim 5, wherein the plurality of the predetermined zones are nonoverlapping.

8. The method of claim 1, wherein the predetermined zone is further defined by a coordinate format header embedded in the advertisement PDU.

9. The method of claim 1, wherein the audio is one portion of a continuous loop, and wherein the BIS comprises metadata indicating that only the one portion of the continuous loop is played back.

10. The method of claim 1, wherein the BIS comprises metadata corresponding to at least one audio channel to be played back by the first device, an additional BIS corresponding to the predetermined zone, or a transition BIS corresponding to a second predetermined zone.

11. The method of claim 1, wherein the action further comprises initiating a Bluetooth connection between the first device and the second device.

12. The method of claim 11, wherein the Bluetooth connection is a Connected Isochronous Stream (CIS).

13. The method of claim 1, wherein the action further comprises requesting a broadcast code from the second device.

14. The method of claim 13, wherein the second device transmits the broadcast code to the first device based on the zone status.

15. The method of claim 1, wherein the action further comprises at least one of selecting a channel for audio playback, modifying an equalizer setting of the audio playback, and modifying a volume level of the audio playback.

16. The method of claim 1, wherein the zone status corresponds to the first device entering the predetermined zone.

17. The method of claim 1, wherein the zone status corresponds to the first device leaving the predetermined zone.

18. A first device, comprising:
    a Bluetooth receiver configured to receive a wave signal transmitted by a second device; and
    a processor configured to:
        calculate a location of the first device relative to the second device based on the wave signal;
        determine a zone status of the first device based on the location of the first device relative to the second device and a predetermined zone; and
        initiate an action based on the zone status, wherein the action comprises playing, via the first device, audio corresponding to a broadcast isochronous stream (BIS) provided by the second device if the zone status indicates that the first device is within the predetermined zone;
    wherein the wave signal is embedded in an advertisement packet, wherein the advertisement packet comprises an advertisement protocol data unit (PDU), wherein the first device is a wireless audio device, and wherein the advertisement PDU comprises an announcement corresponding to the BIS, wherein the first device is a wearable audio device, and wherein the predetermined zone is defined by coordinates embedded in the advertisement PDU.

* * * * *